US012389501B2

(12) United States Patent
Jiang et al.

(10) Patent No.: US 12,389,501 B2
(45) Date of Patent: Aug. 12, 2025

(54) LIGHTING DEVICE

(71) Applicant: Shenzhen Obuy Technology Co., Ltd, Shenzhen (CN)

(72) Inventors: Le Jiang, Shenzhen (CN); Zhiqiang Luo, Shenzhen (CN); Yi Chen, Shenzhen (CN); Hanhao Ye, Shenzhen (CN)

(73) Assignee: Shenzhen Obuy Technology Co., Ltd, Shenzhen (CN)

( * ) Notice: Subject to any disclaimer, the term of this patent is extended or adjusted under 35 U.S.C. 154(b) by 125 days.

(21) Appl. No.: 18/531,566

(22) Filed: Dec. 6, 2023

(65) Prior Publication Data

US 2025/0106960 A1 Mar. 27, 2025

(30) Foreign Application Priority Data

Sep. 27, 2023 (CN) ......................... 202311266716.1

(51) Int. Cl.

| | |
|---|---|
| ***H05B 45/34*** | (2020.01) |
| ***F21L 4/00*** | (2006.01) |
| ***F21L 4/04*** | (2006.01) |
| ***H05B 45/10*** | (2020.01) |
| ***H05B 45/30*** | (2020.01) |
| ***H05B 45/50*** | (2022.01) |

(52) U.S. Cl.

CPC ............ *H05B 45/10* (2020.01); *H05B 45/34* (2020.01); *H05B 45/50* (2020.01)

(58) Field of Classification Search

None

See application file for complete search history.

(56) References Cited

U.S. PATENT DOCUMENTS

2022/0021229 A1* 1/2022 Wang .................... H02J 7/0045

FOREIGN PATENT DOCUMENTS

CN 11734967 A * 10/2020

* cited by examiner

*Primary Examiner* — Anh Q Tran

(74) *Attorney, Agent, or Firm* — Christensen O'Connor Johnson Kindness PLLC

(57) ABSTRACT

The present disclosure relates to a lighting device, comprising a device body and a locking device on both of which magnets magnetically attracted to each other are provided respectively; the device body comprises a controller and a detection module connected to each other, the detection module is configured to detect a connection state between the device body and the locking device, and the controller is configured to control the device body to be in a locked state when the connection state is a magnetic connection state.

10 Claims, 7 Drawing Sheets

LIGHTING DEVICE

CROSS-REFERENCE TO RELATED APPLICATION

This application claims priority to Chinese Patent Application No. 202311266716.1, filed with the China National Intellectual Property Administration and entitled "Lighting Device" on Sep. 27, 2023, which is incorporated herein by reference in its entirety.

TECHNICAL FIELD

The present invention relates to the field of mobile lighting technology, and particularly to a lighting device.

BACKGROUND

Mobile lighting devices are widely used in daily life because such devices are convenient to carry and easy to operate. Due to the portability, a user may put the mobile lighting device in a pocket or store the mobile lighting device in other spaces with sundries. However, the mobile lighting device is prone to miscontact with the sundries, so that the mobile lighting device lights up. If the user does not find the mobile lighting device in time, the power of the device is seriously consumed. In addition, when a mobile lighting device with a higher power lights up for a long time, articles such as clothes and backpacks, etc., may be burned, which is prone to fire and other dangerous accidents.

A commonly used method for preventing miscontact is to provide a lock program, and when a user causes a mobile lighting device to execute the lock program, the mobile lighting device locks its own state without lighting up by miscontact. However, the locking and unlocking modes commonly used at present are designated locking and unlocking operations, such as a long-pressing button or a double-clicking button. Such locking mode and unlocking mode also require the user to read the instructions to learn the locking and unlocking operations, which is not convenient for the user.

SUMMARY

In view of this, as for the above technical problem, it is necessary to provide a lighting device allowing easy locking and unlocking.

The present disclosure provides a lighting device, including a device body and a locking device on both of which magnets magnetically attracted to each other are provided respectively; the device body comprises a controller and a detection module connected to each other, the detection module is configured to detect a connection state between the device body and the locking device, and the controller is configured to control the device body to be in a locked state when the connection state is a magnetic connection state; the magnetic connection represents that an electrical parameter of the detection module monitored by the controller matches a preset magnetic attraction parameter in the controller, the preset magnetic attraction parameter is an electrical parameter corresponding to the electrical parameter of the detection module in a magnetic attraction state, the electrical parameter includes a capacitance and a resistance.

In an embodiment, the locking device includes a resistor-capacitor circuit and a magnetic attraction interface, the detection module of the device body is connected to the resistor-capacitor circuit through the magnetic attraction interface.

In an embodiment, the locking device further includes a charging circuit connected to the magnetic attraction interface.

In an embodiment, the resistor-capacitor circuit includes a Zener diode, a first capacitor and a first resistor connected in parallel; a first terminal of the parallel connection of the zener diode, the first capacitor and the first resistor is connected to the magnetic attraction interface, and a second terminal of the parallel connection of the zener diode, the first capacitor and the first resistor is grounded.

In an embodiment, the detection module includes a power supply control circuit and a voltage detection circuit, both of which are connected to the locking device and the controller.

In an embodiment, the power supply control circuit further includes a first switching transistor and a first protection resistor, a control terminal of the first switching transistor is connected to the controller through the first protection resistor, an input terminal of the first switching transistor is connected to a power supply, and an output terminal of the first switching transistor is connected to the voltage detection circuit and the locking device.

In an embodiment, the voltage detection circuit includes a first voltage dividing resistor and a second voltage dividing resistor connected in series, a first terminal of the series connection of the first voltage dividing resistor and the second voltage dividing resistor is connected to the locking device, a second terminal of the series connection of the first voltage dividing resistor and the second voltage dividing resistor is grounded, and a common terminal of the first voltage dividing resistor and the second voltage dividing resistor is connected to the controller.

In an embodiment, the device body further includes a voltage regulator circuit connected between a power supply and the controller.

In an embodiment, the device body further includes an indicating circuit connected to the controller.

In an embodiment, the indicating circuit includes a level indicating circuit and a power supply indicating circuit, both of which are connected to the controller.

The above-mentioned lighting device includes a device body and a locking device on both of which magnets magnetically attracted to each other are provided respectively; the device body comprises a controller and a detection module connected to each other, the detection module is configured to detect a connection state between the device body and the locking device, and the controller is configured to control the device body to be in a locked state when the connection state is a magnetic connection state. In the present disclosure, a user can control the device body in the lighting device to be in the locked state only by controlling the magnet on the locking device to be adjacent to the magnet on the device body, which is convenient for the user to operate.

DETAILED DESCRIPTION OF THE EMBODIMENTS

In order to make the purposes, technical solution, and advantages of the present disclosure clearer, the present disclosure will be elaborated below with reference to the accompanying drawings and embodiments. It should be appreciated that the specific embodiments described herein are merely illustrative of the present disclosure and are not intended to limit the present disclosure.

It should be appreciated that the terms "first", "second" and the like, as used herein, may be used herein for describing various elements, but these elements are not limited by these terms. These terms are used merely for distinguishing the first element from the other element. For example, a first resistor may be referred to as a second resistor without departing from the scope of the present disclosure, and similarly, the second resistor may be referred to as the first resistor. Both the first resistor and the second resistor are resistors, but they are not the same resistor.

It should be appreciated that the "connection" in the following embodiments should be regarded as "electrical connection" or "communication connection" when there exists electrical signals or data transmission among the connected circuits, modules, units and so on.

It should be appreciated that "at least one" refers to one or more, and "plurality" refers to two or more. "At least a part of an element" refers to a part or all of an element.

As used herein, the singular forms "a", "an" and "the/said" may also include the plural forms unless the context clearly dictates otherwise. It should also be appreciated that the terms "including/comprising" or "having" and the like specify the presence of the stated limitations, integers, steps, operations, components, portions, or combinations thereof, but do not exclude the possibility of presenting or adding one or more other limitations, integers, steps, operations, components, portions, or combinations thereof.

Unless defined otherwise, all technical and scientific terms used herein have the meaning as commonly understood by one of ordinary skill in the art to which the present disclosure relates. The terms used in the specification of the present disclosure are merely for the purpose of describing specific embodiments and are not intended to limit the present disclosure.

Figure 1:
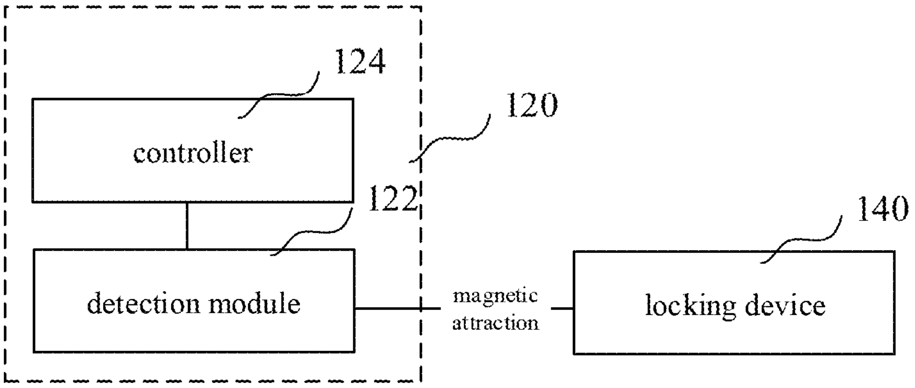
FIG. 1 is a schematic structure diagram of a lighting device according to an embodiment.

In an embodiment, as shown in FIG. 1, a lighting device is provided, which includes a device body 120 and a locking device 140 on both of which magnets magnetically attracted to each other are provided respectively. The device body 120 may include a controller 124 and a detection module 122 connected to each other. The detection module 122 is configured to detect a connection state between the device body 120 and the locking device 140, and the controller 124 is configured to control the device body 120 to be in a locked state when the connection state is a magnetic connection state.

The lighting device is configured to implement the lighting function and is often used in an area with insufficient light, such as a construction site or an area without base lighting devices such as a remote mountainous area. In view of the variability in the application areas and different requirements of users, the lighting device is generally a portable lighting device, i.e., the lighting device is provided with a self-use power source to illuminate without an external power source. As an example, the lighting device may be a searchlight, a flashlight, a laser device, or the like.

The device body 120 has a structure having an illumination function and includes a basic circuit structure for implementing the illumination, and details are not described herein. Specifically, the device body 120 in the present disclosure is further provided with the controller 124 and the detection module 122 in addition to the basic circuit structure for implementing the illumination. The magnets mutually attracted to each other are respectively provided in a position where the detection module 22 is located and a position where the locking device 140 is located, for example, anisotropic magnets are provided respectively. When a distance between the position of the detection module 122 and the position of the locking device 140 is approximately the magnetic attraction distance of the magnets, the detection module 122 and the locking device 140 are turned on due to the magnetic attraction function. The controller 124 is connected to the detection module 122 to acquire the connection state between the detection module 122 and the locking device 140. When the controller 124 acquires that the connection state is the magnetic connection state, the device body 120 is controlled to a locked state.

Further, the locking device 140 may include a first interface, and the detection module 122 may include a second interface. When the connection state between the detection module 122 and the locking device 140 of the device body 120 is the magnetic connection state, the first interface and the second interface are in contact with and communicate with each other due to the magnetic attraction, so that the locking device 140 is connected to the detection module 122.

Specifically, the step that controller 124 acquires the connection state may include: an electrical parameter of the detection module 122 is monitored, a designated voltage is transmitted to the detection module 122, the electrical parameter of the detection module 122 is acquired, and the connection state between the device body 120 and the locking device 140 is calculated and analyzed according to the electrical parameter. When the electrical parameter matches a preset magnetic attraction parameter stored in the controller 124, the controller 124 determines that the current connection state is the magnetic connection, and controls the device body 120 to be in the locked state.

Alternatively, the step that the controller 124 controls the device body 120 to be in the locked state may include: the controller 124 controls other circuits in the device body 120 to be in the locked state, for example, the controller 124 controls a circuit structure in the device body 120 configured to implement the lumination to be in the locked state, or the controller 124 controls a circuit between the control power supply and the circuit structure configured to implement the lumination in the device body 120 to be in a turnoff state. The step that the controller 124 controls the device body 120 to be in the locked state may include: the controller 124 is switched to the locked state. At this moment, the controller 124 does not respond to any activation instruction from the user in any form, and does not perform a corresponding action, so that the device body 120 is controlled to be in the locked state.

As an example, the electrical parameter of the detection module 122 may be a voltage or a current, or a resistance or a capacitance calculated according to the voltage or current and other electrical parameters. A preset magnetic attraction parameter stored in the controller 124 may be an electrical parameter corresponding to the electrical parameter of the detection module 122 in a magnetic attraction state. A locking circuit structure is fixedly provided in the locking device 140. When the detection module 122 is connected to the locking device 140 by the magnetic attraction, that is, when the detection module 122 of the device body 120 is connected to the locking device 140 in a magnetic attraction state, the controller 124 acquires the electrical parameter of the detection module 122 as a fixed value, and stores the fixed value in the controller 124, which is referred to as the preset magnetic attraction parameter.

The lighting device includes the device body 120 and the locking device 140 on both of which magnets magnetically attracted to each other are provided respectively. The device body 120 includes the controller 124 and the detection module 122 connected to each other; the detection module 122 is configured to detect the connection state between the device body 120 and the locking device 140; and the controller 124 is configured to control the device body 120 to be in the locked state when the connection state is the magnetic connection state. In the present disclosure, a user can control the device body 120 in the lighting device to be in the locked state only by controlling the magnet on the locking device 140 to be adjacent to the magnet on the device body 120, which is convenient for the user to operate.

Figure 2:
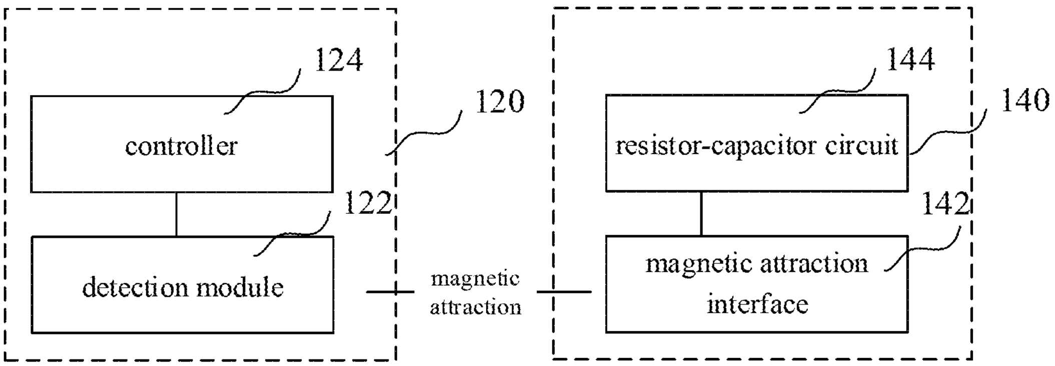
FIG. 2 is a schematic structure diagram of a lighting device according to another embodiment.

In an embodiment, as shown in FIG. 2, the locking device 140 may include a resistor-capacitor circuit 144 and a magnetic attraction interface 142. The detection module 122 of the device body 120 is connected to the resistor-capacitor circuit 144 through the magnetic attraction interface 142.

The magnetic attraction interface 142 is the first interface described above, and is configured to be connected to the device body 120 when the magnet on the device body 120 is magnetized with the magnet on the locking device 140. Specifically, the magnetic attraction interface 142 is connected to the detection module 122 of the device body 120.

Specifically, the resistor-capacitor circuit 144 is a circuit structure fixedly provided in the locking device 140. When the connection state between the locking device 140 and the device body 120 is the magnetic attraction state, the resistor-capacitor circuit 144 is connected to the detection module 122 of the device body 120 through the magnetic attraction interface 142. When the resistor-capacitor circuit 144 is connected to the detection module 122, the electrical parameter obtained by monitoring the detection module 122 after the controller 124 transmits a designated voltage to the detection module 122 is different from the electrical parameter obtained when the resistor-capacitor circuit 144 is not connected to the detection module 122. By distinguishing the electrical parameters in different connection states, the controller 124 can determine the connection state and control the device body 120 according to the connection state.

Optionally, when the controller 124 determines that a current connection state is the magnetic connection state, that is, when the electrical parameter obtained by monitoring the detection module 122 matches the preset magnetic attraction parameter stored in the controller 124, the controller 124 controls the device body 120 to be in the locked state. When the controller 124 determines that the current connection state is a non-magnetic connection state, that is, the electrical parameter obtained by monitoring the detection module 122 mismatches the preset magnetic attraction parameter stored in the controller 124, it is considered that the detection module 122 is not connected to any circuit or the detection module 122 is connected to other devices or other objects. In this case, the controller 124 controls the device body 120 to be in an unlocked state.

Figure 3:
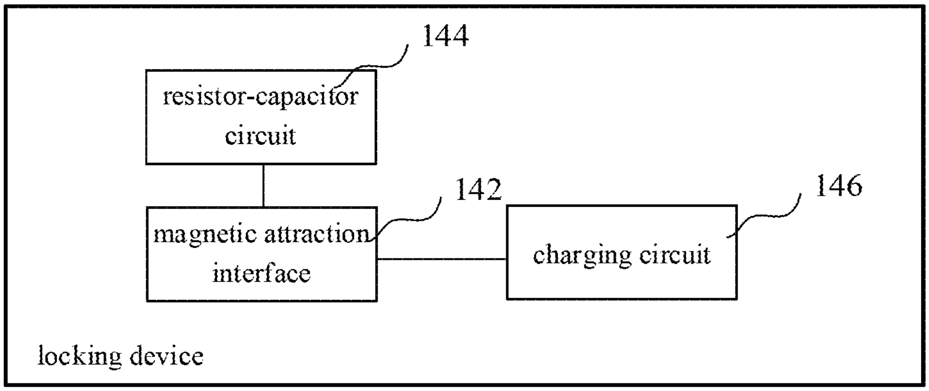
FIG. 3 is a schematic structure diagram of a locking device according to an embodiment.

In an embodiment, as shown in FIG. 3, the locking device 140 may further include a charging circuit 146 connected to the magnetic attraction interface 142.

Figure 4:
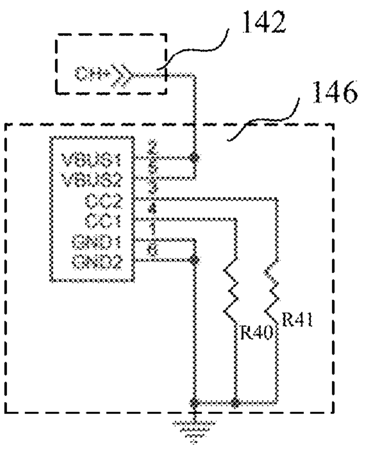
FIG. 4 is a schematic circuit diagram of a charging circuit according to an embodiment.

Optionally, the charging circuit 146 may be a charging interface, which is connected to the magnetic attraction interface 142, through which charging of the lighting device can be implemented when the self-use power supply in the lighting device is insufficient. As shown in FIG. 4, the magnetic attraction interface 142 is identified by CH+; and the charging circuit 146 may include a charging interface having six interfaces, and the charging interface may be a Type-C (USB Type-C, a hardware interface form of a universal serial bus) interface configured to be connected to an external power supply. The charging circuit 146 may further include a protection resistor R40 and a protection resistor R41 both of which are configured to protect components when a voltage of the external power source to which the charging interface is connected is too high, in order to avoid breakdown of the components. As an example, both the resistance value of the protection resistor R40 and the resistance value of the protection resistor R41 are equal to 5.1 KΩ.

Figure 5:
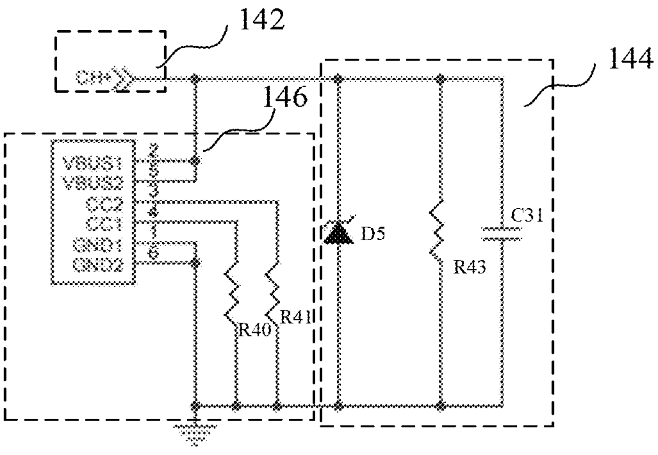
FIG. 5 is a schematic circuit diagram of a locking device according to an embodiment.

In an embodiment, as shown in FIG. 5, the resistor-capacitor circuit 144 may include a zener diode D5, a first capacitor C31 and a first resistor R43 connected in parallel. A first terminal of the parallel connection of the zener diode D5, the first capacitor C31 and the first resistor R43 is connected to the magnetic attraction interface 142, and a second terminal of the parallel connection of the zener diode D5, the first capacitor C31 and the first resistor R43 is grounded.

Specifically, the zener diode D5 is configured to stabilize the voltage of the first capacitor C31 and the first resistor R43. When the controller 124 outputs a designated voltage to the detection module 122, and the detection module 122 is connected to the locking device 140, the detection module 122 is connected to the resistor-capacitor circuit 144 through the magnetic attraction interface 142, and outputs the designated voltage to the zener diode D5, the first capacitor C31, and the first resistor R43. The first capacitor C31 and the first resistor R43 in combination with the original circuit structure of the detection module 122 may change the electrical parameters in the detection module 122. If the electrical parameter of the detection module 122 detected by the controller 124 matches the preset magnetic attraction parameter in the controller 124, it can be determined that the connection state between the locking device 140 and the device body 120 is the magnetic connection state. Accordingly, the electrical parameter acquired by the controller 124 when the detection module 122 is connected to the resistor-capacitor circuit 144 matches the preset magnetic attraction parameter stored in the controller 124.

As an example, the zener diode D5 may be a Transient Voltage suppressor (TVS) diode, and further, may be a PESD series TVS diode. The resistance value of the first resistor R43 is 270 KΩ, the capacitance value of the first capacitor C31 is 1 uF, and the rated voltage is 25V.

When the first resistor R43 and the first capacitor C31 are connected to the detection module 122 by arranging the first resistor R43 with the fixed resistance value and the first capacitor C31 with the fixed capacitance value, the controller 124 monitors that the electrical parameter of the detection module 122 matches the preset magnetic attraction parameter, and determines that the detection module 122 is magnetically connected to the locking device 140, thereby determining that the device body 120 needs to be locked.

Figure 6:
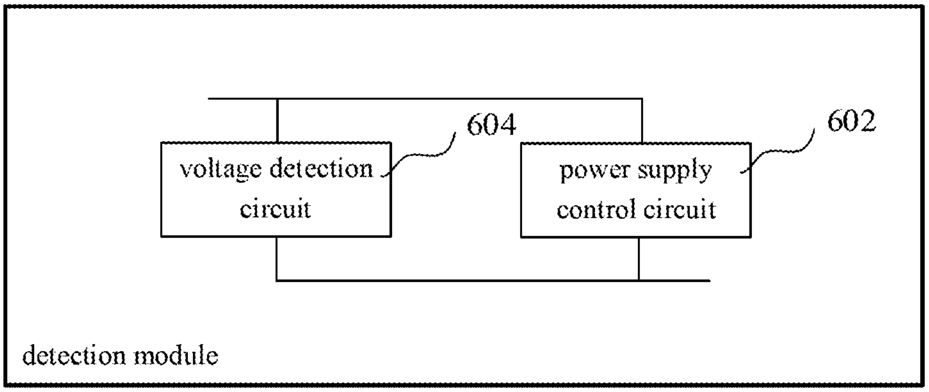
FIG. 6 is a schematic structure diagram of a detection module according to an embodiment.

In an embodiment, as shown in FIG. 6, the detection module 122 may include a power supply control circuit 602 and a voltage detection circuit 604, both of which are connected to the locking device 140 and the controller 124.

Specifically, the power supply control circuit 602 is further connected to a power supply voltage, and the controller 124 may control whether a designated voltage, which is a power supply voltage, is connected to the voltage detection circuit 604 by controlling the on-off of the power supply control circuit 602. When the controller 124 controls the power supply control circuit 602 to turn off, the voltage detection circuit 604 has no supply voltage input. In this case, even if the detection module 122 is magnetically connected to the locking device 140, there is no supply voltage input in the locking device 140. When the controller 124 controls the power supply control circuit 602 to turn on, the voltage detection circuit 604 continuously detects and outputs an electrical parameter to the controller 124, which is an electrical parameter of the detection module 122 and is configured to cause the controller 124 to determine, according to the analysis of the electrical parameter, the connection state between the detection module 122 and the locking device 140.

Figure 7:
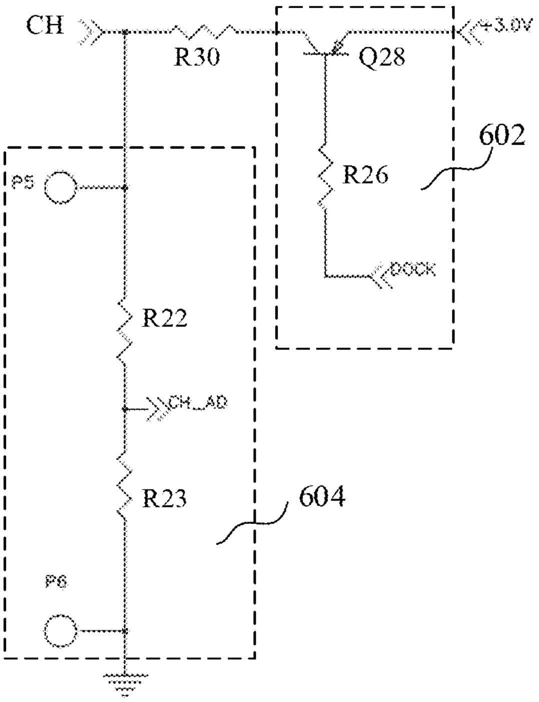
FIG. 7 is a schematic circuit diagram of a detection module according to an embodiment.

In an embodiment, as shown in FIG. 7, the power supply control circuit 602 may include a first switching transistor Q28 and a first protection resistor R26. A control terminal of the first switching transistor Q28 is connected to the controller 124 through the first protection resistor R26; an input terminal of the first switching transistor Q28 is connected to the power supply; and an output terminal of the first switching transistor Q28 is connected to the voltage detection circuit 604 and the locking device 140.

Specifically, the interface of the controller 124 connected to the first protection resistor R26 is marked as "DOCK", and the controller 124 transmits different level signals to the control terminal of the first switching transistor Q28, for example, a high level signal and a low level signal, so that the on-off of the first switching transistor Q28 can be controlled. When the first switching transistor Q28 is turned on, the supply voltage (+3.0V) of the power supply obtained at the input terminal of the first switching transistor Q28 is transmitted to the output terminal of the first switching transistor Q28, and then is transmitted to the voltage detection circuit 604 and the locking device 140 through the output terminal of the first switching transistor Q28. A second interface through which the detection module 122 is connected to the locking device 140 is marked as "CH".

As an example, the first switching transistor Q28 is a PNP transistor of TK3906 type, and the first protection resistor R26 has a resistance of 1 MΩ.

Optionally, a protection resistor R30 is provided among the power supply control circuit 602, the locking device 140, and the voltage detection circuit 604. The protection resistor R30 can reduce changes in the electrical parameter caused by circuit fluctuations and improve the anti-interference capability of the detection assembly. The resistance of the protection resistor R30 may be 150 KΩ.

In an embodiment, as shown in FIG. 7, the voltage detection circuit 604 may include a first voltage dividing resistor R22 and a second voltage dividing resistor R23 connected in series. A first terminal of the series connection of the first voltage dividing resistor R22 and the second voltage dividing resistor R23 is connected to the locking device 140; a second terminal of the series connection of the first voltage dividing resistor R22 and the second voltage dividing resistor R23 is grounded; and a common terminal of the first voltage dividing resistor R22 and the second voltage dividing resistor R23 is connected to the controller 124.

P5 denotes a positive pole of a magnetic field, and P6 denotes a negative pole of the magnetic field. The magnet is provided at the voltage detection circuit 604, so that the position in which the voltage detection circuit 604 is magnetically connected to the locking device 140 is accurate, which allows the magnetic attraction interface 142 to be attached to the second interface. The controller 124 connected to the common terminal of the first voltage dividing resistor R22 and the second voltage dividing resistor R23 is marked as "CH_AD". The controller 124 acquires electrical parameters of the voltage detection circuit 604, such as a current, a voltage, and the like, and obtains a total resistance value and a total capacitance value by analysis and calculation. The calculation formula of the capacitance value is as follows:

$$Vt = V0 + (Vu - V0) * [1 - \exp(-t/RC)].$$

The above formula is a capacitor charging time constant formula, in which Vt denotes a voltage value on the capacitor when the charging time is t; V0 denotes an initial voltage value on the capacitor (which is equal to 0V in the circuit of the present disclosure); Vu denotes a termination voltage value when the capacitor is fully charged (which is equal to 3V*R30/(R30+R43) in the circuit of the present disclosure); Exp( ) denotes an exponential function based on e.

As can be seen from the above formula, the voltage across the capacitor in the locking device 140 (such as the first capacitor C31 in FIG. 5) can be informed by controlling the charging time t, so that the capacitance value of the capacitor can be obtained.

As an example, the resistance value of the first voltage dividing resistor R22 is 470 KΩ, and the resistance value of the second voltage dividing resistor R23 is 330 KΩ.

Figure 8:
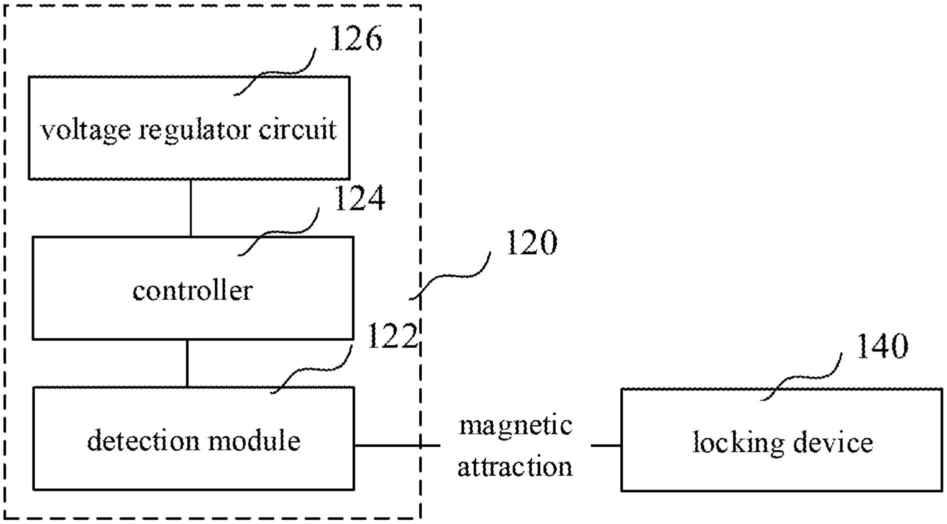
FIG. 8 is a schematic structure diagram of a lighting device according to another embodiment.

In an embodiment, as shown in FIG. 8, the device body 120 may further include a voltage regulator circuit 126 connected between the power supply and the controller 124.

Specifically, the voltage regulator circuit 126 is configured to regulate the power supply voltage to stabilize the supply voltage outputted from the voltage regulator circuit 126. An input terminal of the voltage regulator circuit 126 is connected to the power supply, and an output terminal of the voltage regulator circuit 126 is connected to the controller 124 and is configured to output a stable supply voltage to the controller 124. The output terminal of the voltage regulator circuit 126 may further be connected to the detection module 122 and configured to output a stable supply voltage to the detection module 122. The input terminal of the voltage regulator circuit 126 may further be connected to the locking device 140 and configured to receive electric energy from an external power supply and output a supply voltage therefrom when the locking device 140 includes the charging circuit 146.

Figure 9:
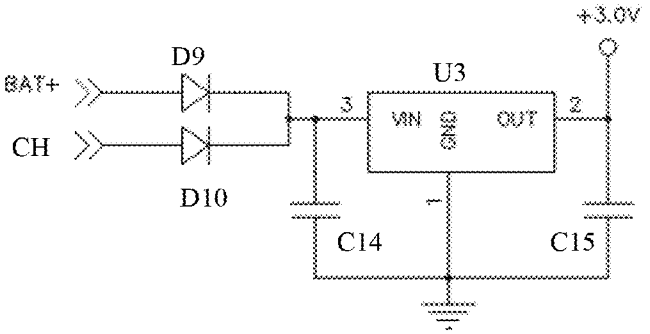
FIG. 9 is a schematic circuit diagram of a voltage regulator circuit according to an embodiment.

As an example, the voltage regulator circuit 126, as shown in FIG. 9, may include a filter diode D9, a filter diode D10, a filter capacitor C14, a filter capacitor C15, and a voltage regulator chip U3. The filter diode D9 is connected to the power supply (the power supply is denoted as BAT+), and the power supply transmits the power supply voltage to the voltage regulator chip U3 through the filter diode D9. When the locking device 140 is connected to the external power supply and the voltage regulator circuit 126, the external power supply transmits the external power supply voltage to the voltage regulator chip U3 through the second interface (marked as CH) and the filter diode D10. The voltage regulator chip U3 regulates the power supply voltage or the external power supply voltage, and outputs the supply voltage (+3.0V) to the controller 124 or the detection module 122. The filter capacitor C14 is configured to filter the power supply voltage or the external power supply voltage inputted, and the filter capacitor C15 is configured to filter the outputted supply voltage.

Figure 10:
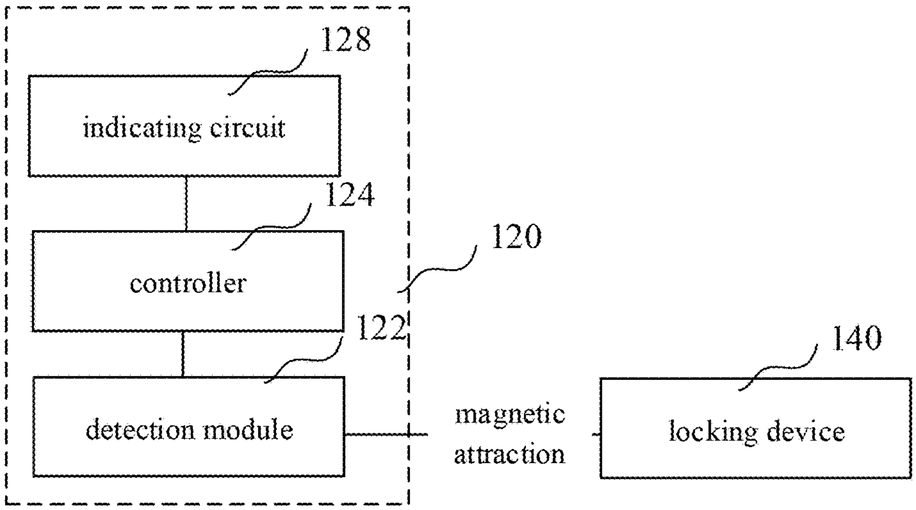
FIG. 10 is a schematic structure diagram of a lighting device according to another embodiment.

In an embodiment, as shown in FIG. 10, the device body 120 may further include an indicating circuit 128 connected to the controller 124. The indicating circuit 128 is configured to indicate an operating state of the lighting device, to prompt the user of a current state of the lighting device, which facilitates the user to observe the lighting device timely and to change the operating state of the lighting device as required. In an embodiment, the indicating circuit 128 may include a level indicating circuit and a power supply indicating circuit, both of which are connected to the controller 124. The level indicating circuit is configured to indicate a corresponding level when a level is on, and the power indicating circuit is configured to indicate that the power supply is available when the power supply is on or when the power supply energy is sufficient.

Figure 11:
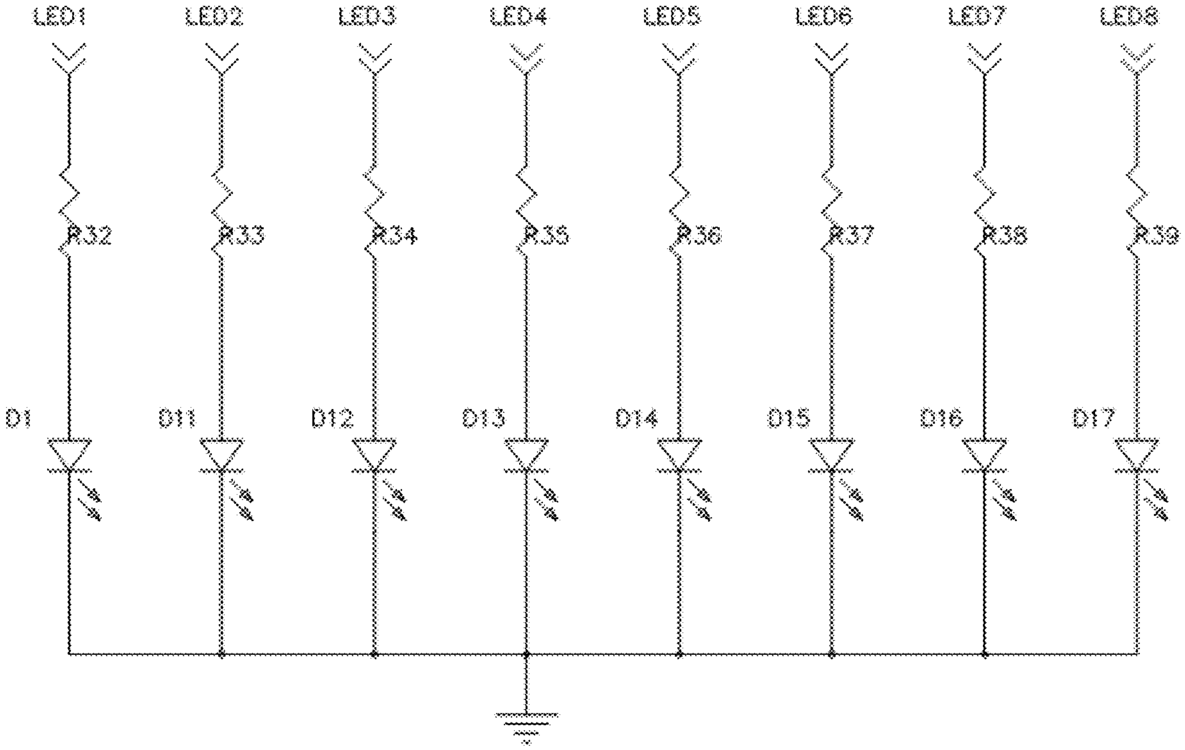
FIG. 11 is a schematic circuit diagram of a level indicating circuit according to an embodiment.

As an example, as shown in FIG. 11, the level indicating circuit may include a plurality of level indicating branches each of which includes a resistor (R32, R33, R34, R35, R36, R37, R38, or R39) and a light emitting diode (D1, D11, D12, D13, D14, D15, D16, or D17). "LED1-LED8" represents an interface connected to the controller 124. The controller 124 controls a corresponding indicator light (the light emitting diode) to light on or off by controlling a voltage outputted to a level indicating branch. A resistance value of each level indicating branch is 470Ω, and the light emitting diode of each level indicating branch is a green light emitting diode (GREEN). Optionally, the number of the level indicating branches, the resistance value of each level indicating branch, and the color of the light emitting diode of each level indicating branch are not limited, and FIG. 11 merely shows one example.

Figure 12:
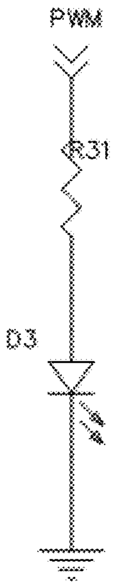
FIG. 12 is a schematic circuit diagram of a power indicating circuit according to an embodiment.

The circuit structure of the power supply indicating circuit is similar to that of each level indicating branch. As shown in FIG. 12, the power supply indicating circuit may include a resistor R31 and a light emitting diode D3. "PWM" denotes an interface connected to the controller 124. The resistance value of the resistor R31 is 100Ω, and the color of the light emitting diode D3 is white (WHITE).

In the present embodiment, by providing the power supply indicating circuit and the level indicating circuit, the operating state of the lighting device can be indicated, which is convenient for the user to view, and is advantageous for improving the availability of the lighting device.

Figure 13:
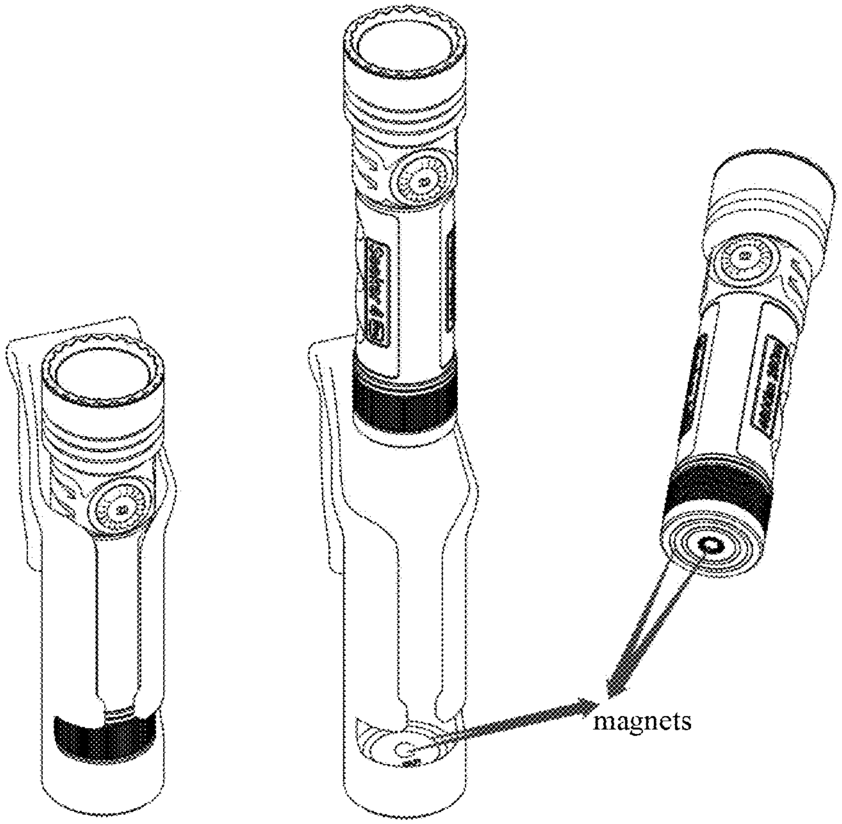
FIG. 13 is a schematic diagram illustrating a lighting device according to an embodiment.
Figure 14:
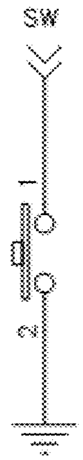
FIG. 14 is a schematic circuit diagram of an activation button according to an embodiment.

For a better understanding of the above solution, the present disclosure will be elaborated below in combination with a specific embodiment. In an embodiment, as shown in FIG. 13, the lighting device may include the device body and the locking device. The device body may be a flashlight, and the locking device may be a housing. Specifically, the device body may include a controller, a detection module, a voltage regulator circuit, an indicating circuit, and an activation button. The controller is a SC92L8532 single-chip microcomputer; and the detection module includes a second interface, a power supply control circuit, and a voltage detection circuit. A specific circuit structure is shown in FIG. 7, in which the indicating circuit includes a level indicating circuit and a power supply indicating circuit, as shown in FIGS. 11 and 12. The voltage regulator circuit is as shown in FIG. 9, which is described above and will not be repeated herein. As shown in FIG. 14, the activation button "SW" is an interface connected to the controller. The locking device includes a resistor-capacitor circuit, a magnetic attraction interface, and a charging circuit. A specific circuit structure is shown in FIG. 5, and the details are not repeated herein.

In the present embodiment, a passive RC circuit (resistor-capacitor circuit) in the housing is in contact with the voltage detection circuit in the flashlight by the magnetic attraction, and the passive RC circuit in the housing is charged and discharged by the SC92L8532 single-chip microcomputer in the flashlight, and the resistance and capacitance values are identified. If the SC92L8532 single-chip microcomputer identifies preset corresponding resistance value and capacitance value, the flashlight is regarded as being inserted into the housing. The SC92L8532 single-chip microcomputer controls the flashlight to be in a locked state and turns off various indicator lights of the flashlight (or provides a locking indicator light for the locked state). When the flashlight is pulled out of the housing, the resistance value and the capacitance value detected by the SC92L8532 single-chip microcomputer in the flashlight do not match the preset values, and if it is determined that the flashlight is disconnected from the passive RC circuit in the housing, the flashlight is unlocked, and meanwhile the level indicator light and the power indicator light on the flashlight light up according to the current operating state of the flashlight, which indicates that the flashlight is unlocked. Since the circuit in the housing is a passive design, the plug-in and pull-out operations can be identified with extremely low power consumption, the implementation cost of the solution is extremely low, the startup risk caused by miscontact can be avoided, the mode of pulling out of the housing to unlock may also reduce the tedious operation of the unlocking, accordingly the flashlight can be conveniently used, and the large-scale application is facilitated.

In the description of the present disclosure, reference to the terms "some embodiments", "other embodiments" and the like, means that particular features, structures, materials, or characteristics described in connection with these embodiments or examples may be included in at least one embodiment or example of the present disclosure. In the present disclosure, a schematic description of the above terms does not definitely refer to the same embodiments or examples.

Each of the technical features in the above embodiments may be combined arbitrarily. For the sake of brevity, all possible combinations of the technical features in the above embodiments are not described. However, the combinations of these technical features should be regarded as falling within the scope of the present disclosure as long there is no contradiction among these combinations.

The above-mentioned embodiments merely represent some implementation modes, the description thereof is in more specific and detailed, but are not therefore to be construed as limiting the scope of the patent disclosure. It should be noted that those skilled in the art can make a number of transformations and modifications without departing from the spirit and scope of the present disclosure. Accordingly, the scope of protection of the present disclosure should be subject to the appended claims.

What is claimed is:

1. A lighting device, comprising a device body and a locking device on both of which magnets magnetically attracted to each other are provided respectively; wherein the device body comprises a controller and a detection module connected to each other, the detection module is configured to detect a connection state between the device body and the locking device, and the controller is configured to control the device body to be in a locked state when the connection state is a magnetic connection state; and the magnetic connection represents that an electrical parameter of the detection module monitored by the controller matches a preset magnetic attraction parameter in the controller, the preset magnetic attraction parameter corresponds to the electrical parameter of the detection module in a magnetic attraction state, and the electrical parameter comprises a capacitance and a resistance.

2. The lighting device according to claim 1, wherein the locking device comprises a resistor-capacitor circuit and a magnetic attraction interface, and the detection module of the device body is connected to the resistor-capacitor circuit through the magnetic attraction interface.

3. The lighting device according to claim 2, wherein the locking device further comprises a charging circuit connected to the magnetic attraction interface.

4. The lighting device according to claim 2, wherein the resistor-capacitor circuit comprises a zener diode, a first capacitor and a first resistor connected in parallel, a first terminal of the parallel connection of the zener diode, the first capacitor and the first resistor is connected to the magnetic attraction interface, and a second terminal of the parallel connection of the zener diode, the first capacitor and the first resistor is grounded.

5. The lighting device according to claim 1, wherein the detection module comprises a power supply control circuit and a voltage detection circuit, both of which are connected to the locking device and the controller.

6. The lighting device according to claim 5, wherein the power supply control circuit further comprises a first switching transistor and a first protection resistor, a control terminal of the first switching transistor is connected to the controller through the first protection resistor, an input terminal of the first switching transistor is connected to a power supply, and an output terminal of the first switching transistor is connected to the voltage detection circuit and the locking device.

7. The lighting device according to claim 5, wherein the voltage detection circuit comprises a first voltage dividing resistor and a second voltage dividing resistor connected in series, a first terminal of the series connection of the first voltage dividing resistor and the second voltage dividing resistor is connected to the locking device, a second terminal of the series connection of the first voltage dividing resistor and the second voltage dividing resistor is grounded, and a common terminal of the first voltage dividing resistor and the second voltage dividing resistor is connected to the controller.

8. The lighting device according to claim 1, wherein the device body further comprises a voltage regulator circuit connected between a power supply and the controller.

9. The lighting device according to claim 1, wherein the device body further comprises an indicating circuit connected to the controller.

10. The lighting device according to claim 9, wherein the indicating circuit comprises a level indicating circuit and a power supply indicating circuit, both of which are connected to the controller.

* * * * *